Oct. 2, 1956

R. D. BUDD 2,764,872

RING BEAM ASSEMBLY JIG FOR TUNNELING MACHINE

Filed March 11, 1955

INVENTOR.
Robert D. Budd
BY
Murray A. Gleeson
ATTORNEY

INVENTOR.
Robert D. Budd

Oct. 2, 1956      R. D. BUDD      2,764,872
RING BEAM ASSEMBLY JIG FOR TUNNELING MACHINE
Filed March 11, 1955      3 Sheets—Sheet 3

INVENTOR.
Robert D. Budd
BY
Murray A. Gleeson
ATTORNEY

United States Patent Office 2,764,872
Patented Oct. 2, 1956

2,764,872
RING BEAM ASSEMBLY JIG FOR TUNNELING MACHINE

Robert D. Budd, La Grange Park, Ill., assignor to Goodman Manufacturing Company, Chicago, Ill., a corporation of Illinois Application March 11, 1955, Serial No. 493,797

7 Claims. (Cl. 61—84)

This invention relates to improvements in tunneling machines, and more particularly to tunneling machines for cutting a large bore having a diameter in the order of 10 feet or more.

The principal object of the invention is to provide a simple and efficient form and method of operation of a ring beam assembly jig, mounted on the supporting frame of the machine to the rear of the face, for mechanically assembling and fixing a series of annular ring beams in supporting engagement with the tunnel walls as rapidly as the tunnel is advanced.

The invention may best be understood by reference to the accompanying drawings, in which.

Figure 1:
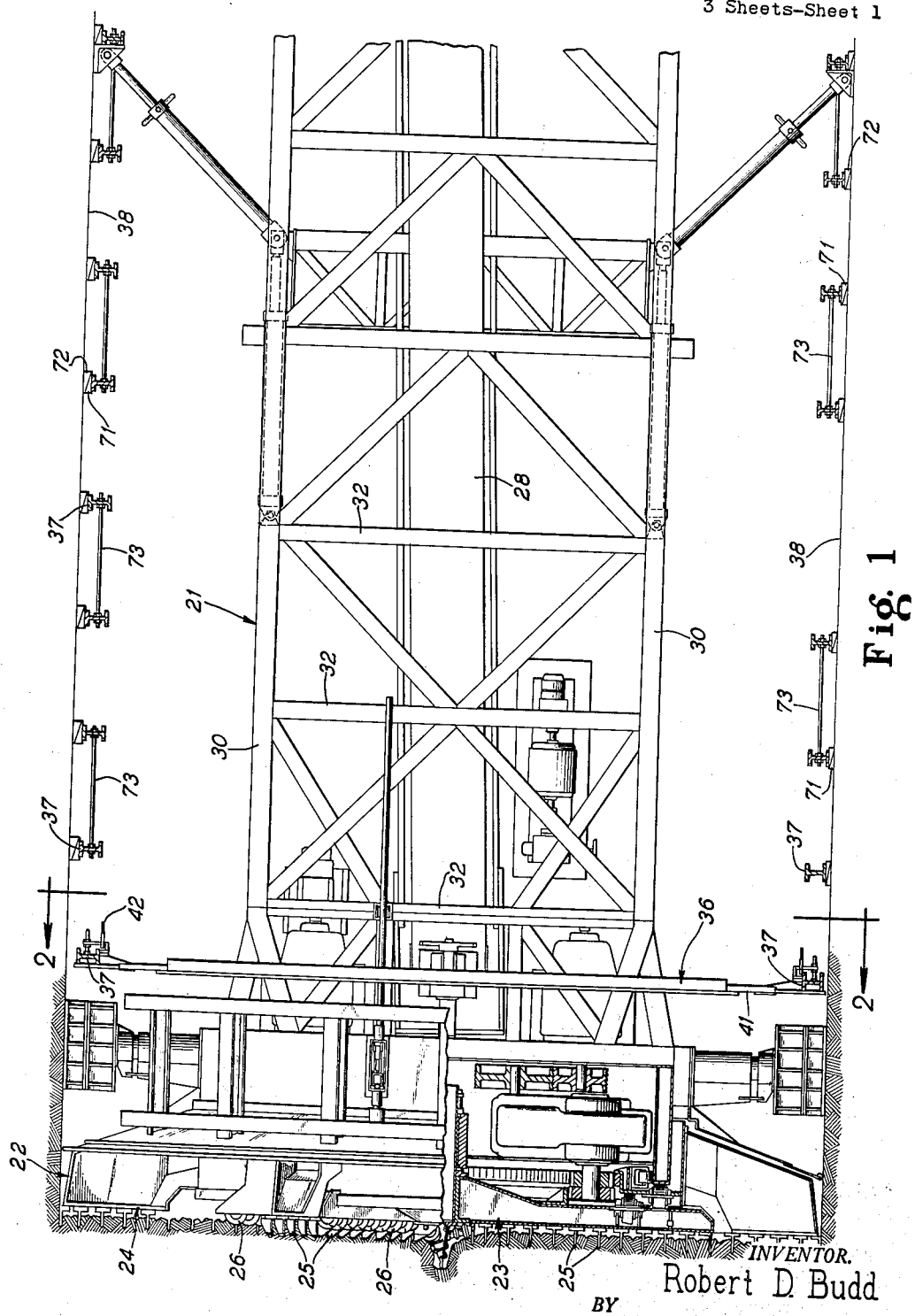
Figure 1 is a fragmentary plan view showing the front end of a tunneling machine of the boring head type in operative position in a tunnel, with certain parts of the machine broken away, and showing the ring beam assembly jig forming the subject of the present invention, mounted on said machine in position for assembling and positioning a ring beam in the tunnel.

Referring first to the general features of construction of the tunneling machine shown in the drawings as illustrative of the general class of tunneling machines to which the present invention is especially applicable, said machine has as its principal elements a main supporting frame or jumbo 21, having a cutting head at its forward end indicated generally at 22. In the form shown herein the cutter head consists essentially of a circular inner cutter member 23, and a surrounding outer cutter member 24 arranged for rotation in opposite directions, to neutralize the torque on the jumbo. The cutter members 23 and 24 are provided with projecting cutter bits 25 and core-breaking rollers 26, all arranged in a working plane disposed perpendicularly to the general axis of rotation of the cutter head.

The illustrative form and arrangement of the cutter head and its driving means shown in the drawings form the subject of a copending application of James S. Robbins bearing Serial No. 503,702, filed April 25, 1955, so need not be described in greater detail herein since it will be understood that the ring beam assembly jig which forms the subject matter of the present invention can be used with other tunneling machines of various types either with or without boring heads.

The form of main frame or jumbo 21 shown in the drawings is also more fully described in the copending application of James S. Robbins above referred to and is shown herein merely as illustrative of a suitable frame or jumbo for a cutter head, by which the machine as a whole may be supported and advanced in its tunneling operations. The jumbo may, as usual, have a continuous conveyor indicated generally at 28, extending therealong for receiving the material removed by the boring head and removing such material for discharge at the rear end of said jumbo.

Figure 2:
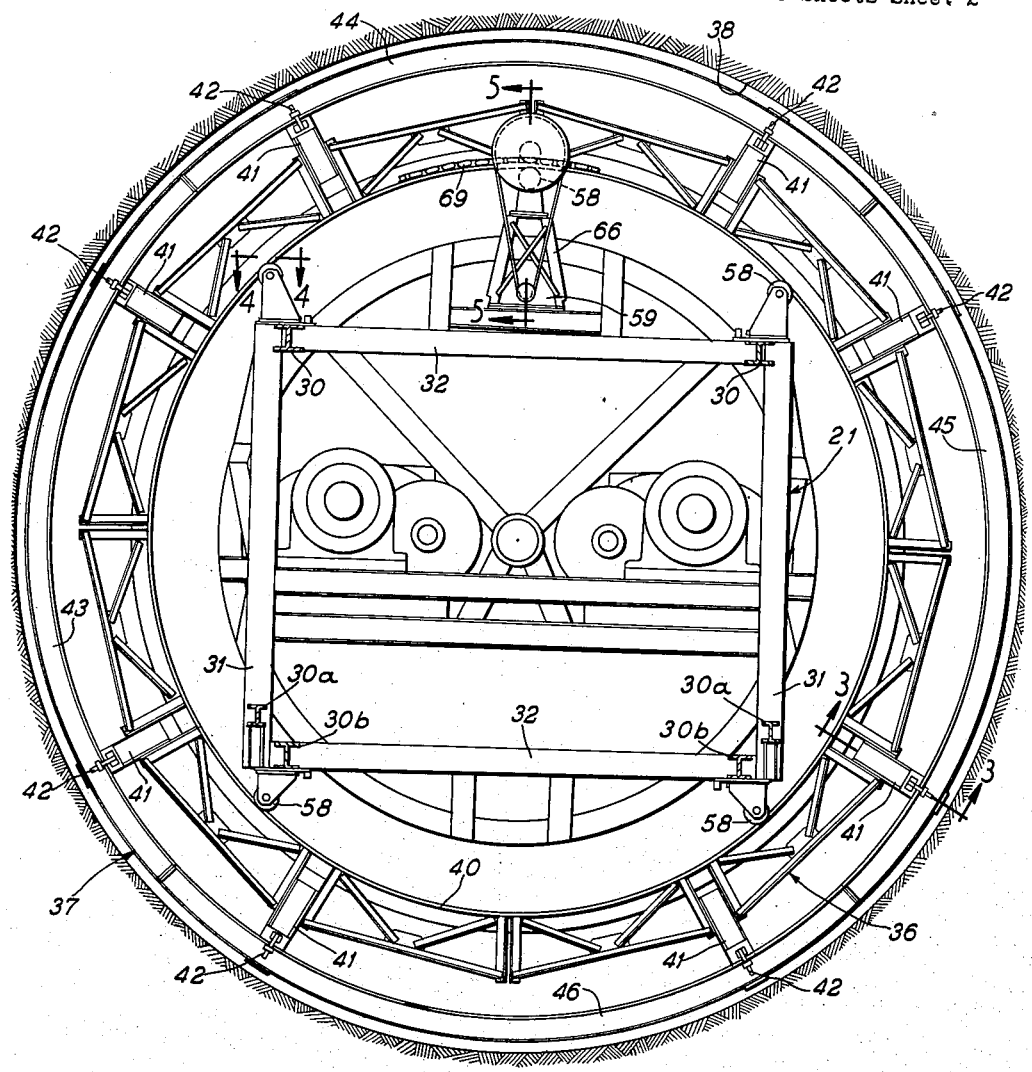
Figure 2 is a section taken on line 2—2 of Figure 1.
Figure 4:
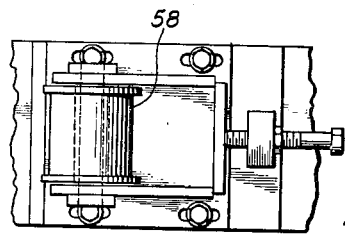
Figure 4 is a detail section taken on line 4—4 of Figure 2.

As shown in Figures 1 and 2, the jumbo 21 shown herein comprises an elongated frame, generally rectangular in cross section and including longitudinal beams 30, 30 at each corner of the frame, connected by a series of upright beams 31, 31 at opposite sides of said frame, and transverse beams 32, 32 across the top and bottom of said frame. The lowermost longitudinal beams 30 may, for strength, be divided into two diverging beam sections 30a, 30b where the front end of the frame is connected to the cutter head.

Referring now more particularly to the details of the ring beam assembly jig indicated generaly at 36, which forms the subject matter of my invention, said ring beam assembly jig is mounted on the jumbo 21 adjacent the rear of the cutter head for the purpose of mechanically assembling and positioning a series of successively spaced ring beams 37 for supporting the tunnel wall 38 as rapidly as the tunnel is advanced. Said ring beam assembly jig consists of a flanged erector ring 40, which surrounds the entire jumbo 21, and which has eight supporting arms 41 extending radially therefrom. At the end of each of the supporting arms 41 is bolted a toggle clamp 42, shown in detail in Figure 3, designed to temporarily clamp and hold a segment, preferably a quarter section or quadrant, of a ring beam 37 while the ring beam is being assembled in the tunnel, as will presently appear.

Figure 3:
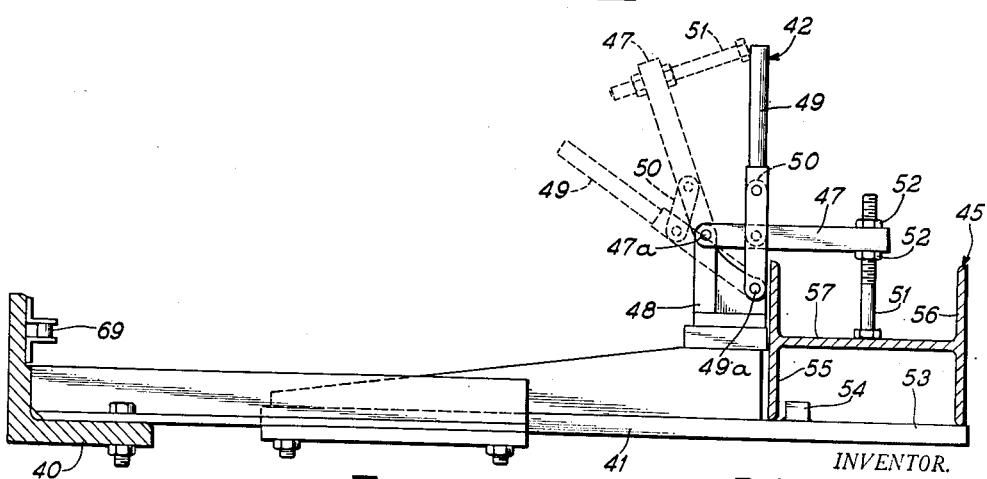
Figure 3 is an enlarged detail section taken on line 3—3 of Figure 2.

In the form shown in detail in Figure 3, each toggle clamp includes an arm 47 pivoted at 47a to a support 48 projecting rearwardly from its supporting arm 41. A hand lever 49 is pivoted at 49a on support 48 at a point radially outwardly of the arm 41, but closer to said arm. Said hand lever is connected by a short link 50 to the arm 47. The lever 47 has a transversely extending abutment member 51 connected to its swinging end, said abutment member herein consisting of a bolt having longitudinally threaded adjustment with respect to the end of the lever 47 and held in adjusted position by lock nuts 52.

Each supporting arm 41 also has an extension 53 projecting radially beyond the support 48, and having a stop lug 54 thereon spaced a short distance from the outer face of the support 48.

The parts of the toggle clamp hereinabove described are arranged so that a portion of the ring beam indicated at 45, having an I-beam cross section, as shown in Figure 3, may be supported thereon with the flanges 55 and 56 on one side of said beam portion in engagement with the extension 53, and with innermost flange 55 fitting between the support 48 and the lug 54. Said ring beam section is temporarily clamped in place by swinging the hand lever 49 outwardly, to bring lever 47 downwardly to engage abutment member 51 with the outer face of the main web 57 of said ring beam section, as shown in full lines in Figure 3. When in this position the parts may be temporarily locked in place by the toggle action of the short link 50, which is then in substantially vertical alignment with the hand lever 49. To release the toggle clamp, the hand lever 49 is moved inwardly to swing the arm 47 and the abutment member 51 out of engagement with the ring beam portion, as shown in dotted lines in Figure 3.

Figure 5:
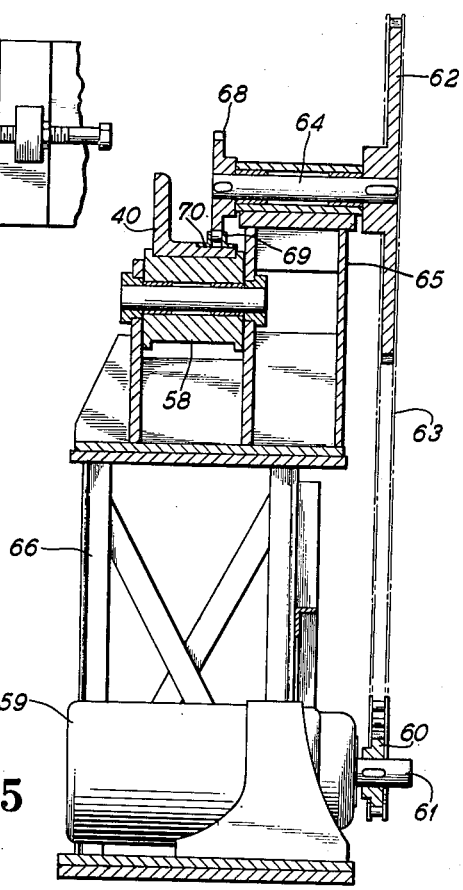
Figure 5 is a section taken on the line 5—5 of Figure 2.

The inner edge of the assembly jig erector ring 36 rides on five grooved rollers 58 supported on the jumbo 21 to permit the entire assembly jig to rotate about said jumbo. The erector ring is rotated by a small motor 59 mounted on the top of the jumbo, having a sprocket 60 keyed on its shaft 61 which drives a large sprocket 62 through a chain 63. As seen in Figure 5, this large sprocket 62 is keyed at one end of a shaft 64, mounted on a pillow block 65, supported by an auxiliary frame 66 on top of the jumbo. The shaft 64 has keyed at its other end a small sprocket 68 which engages a roller chain 69 supported in an annular groove 70 about the inner flanged periphery of the jig ring 40. The roller chain 69 is suitably fastened as by welding to the jig ring 40, thus providing an inexpensive external ring gear by which the assembly can be rotated about the jumbo.

The use and operation is as follows:

The ring beam quadrants, all of identical construction, are brought into the tunnel and stored on the floor or on top of the jumbo as close as convenient to the assembly jig.

When the boring head has been advanced to a point where the assembly jig is freed from the last ring set, one of the quadrants of the ring beam 37 is clamped across a pair of the supporting arms or chairs 41, either at the top or the bottom (depending on whether top- or bottom-loading is used) so as to form a convenient loading station at the top or floor of the tunnel.

It will be understood that the first quadrant of ring beam 37 is clamped to the assembly jig 36, with the two toggle clamps 42, 42 spaced equidistant from the opposite ends of the quadrant and with the outer face of the quadrant having sufficient clearance between itself and the tunnel wall to permit the quadrant to be rotated for assembly of the completed ring beam 37, as will now be described.

If it is desired to start assembly of the ring beam 37 by attaching quadrants to the erector ring 36 at the floor level, the process will be as follows:

Quadrant 43 of ring beam 37 will be mounted across the proper chairs 41, 41 at floor level and secured thereto by the clamp means such as described above. The erector ring is then rotated in, say a counterclockwise direction (Figure 2) until, successively, quadrants 44, 45, 46 are mounted on the erector ring chairs in the same manner. As quadrants are added, connections 75 between them are completed, as by means of bolting or welding (not shown), as may be required by their design. Thus, the complete, circular ring beam 37 is concurrently assembled, erected and held to its predetermined diameter and the segments 43, 44, 45 and 46 will now appear in the order shown in Figure 2.

Alternately, erection of ring beams 37 may be made working from the top deck of the jumbo by installing the first segment of the ring beam at the crown by the tunnel and rotating and erecting subsequent quadrants in a manner similar to that described above for the bottom loading operation.

The erector ring of course is carried forward by the advancing jumbo and when it has moved the assembled ring beam to its final location a number of pairs of wedges 71, 72 are then inserted from opposite sides of the ring, and between the ring beam and the tunnel wall, as indicated in Figure 1, so as to position the completed ring beam 37 firmly in the tunnel. The toggle clamps are then disconnected from the ring beam by operating the hand lever 49 of each toggle clamp so as to swing the arm 47 and the abutment member 51 inwardly, as shown in dotted lines in Figure 3, thus freeing the ring beam from all supporting relationship to the erector ring and the boring machine.

In practice, after each complete ring beam 37 is set in place as described, it may be secured to the preceding ring beam by a plurality of tie rods 73, as seen in Figure 1. Under some conditions it may also be desirable to apply a concrete liner (not shown) to the interior walls of the tunnel as the latter is advanced, in which case the ring beams 37 and the tie rods 73 may be partially or wholly imbedded in said concrete liner.

Although I have shown and described certain embodiments of my invention, it will be understood that I do not wish to be limited to the exact construction shown and described nor to the exact methods of operation and use described but that various changes and modifications may be made without departing from the spirit and scope of the invention as defined by the appended claims.

I claim:

1. In a tunneling machine having a boring head a frame or jumbo for supporting said boring head extending rearwardly from the latter, a ring beam assembly jig comprising an annular erector ring member rotatably mounted on and surrounding said frame, said erector ring member having a plurality of circumferentially spaced clamping members for detachably engaging a plurality of segments of a continuous ring beam closely adjacent to the wall of the tunnel being driven, and means for rotating said erector ring about said frame member to permit the ring beam segments to be successively attached to said erector ring at a predetermined loading station and rigidly connected in end-to-end relation with adjacent ring beam segments.

2. In a tunneling machine having a boring head a frame or jumbo for supporting said boring head extending rearwardly from the latter, a ring beam assembly jig comprising an erector ring member rotatably mounted on and surrounding said frame concentrically of the tunnel axis, said erector ring member having a plurality of circumferentially spaced clamping members for detachably engaging a plurality of segments of a continuous ring beam closely adjacent to the wall of the tunnel being driven, means for rotating said elector ring about said frame member to permit the ring beam segments to be successively mounted on said erector ring at a predetermined loading station and rigidly connected in end-to-end relation with adjacent ring beam segments.

3. In a tunneling machine having a circular cutter head with an elongated supporting frame or jumbo extending rearwardly therefrom, a ring beam assembly jig comprising an annular erector ring member rotatably mounted on said frame to the rear and concentrically of said cutter head, said erector ring member having a plurality of circumferentially spaced clamping members for detachably engaging a plurality of segments of a continuous ring beam closely adjacent to and concentric with the wall of the tunnel formed by the cutter head, and manually controlled power means for rotating said erector ring about said frame member to permit the ring beam segments to be successively engaged by said erector ring at a predetermined loading station, and rigidly connected in end-to-end relation with adjacent ring beam segments.

4. The method of assembling a continuous ring beam by means of an erector ring assembly rotatably mounted on a machine used in a tunneling operation, which consists in detachably mounting an arcuate segment of the ring beam on a portion of said erector ring, which portion is temporarily rotated to a predetermined loading station adjacent the tunnel wall, then rotating the erector ring to said predetermined loading position, then detachably mounting a second arcuate segment of the ring beam on said second portion of the ring in end-to-end relation to the first ring beam segments, and rigidly connecting the meeting ends of said segments together, thereafter repeating the mounting of successive arcuate segments on said erector ring and connecting their meeting ends together as aforesaid, until a complete continuous rigid ring beam is formed, then securing said completed ring beam to the tunnel wall, and detaching said complete ring beam from the erector ring to free the erector ring for further advance in the tunnel.

5. The method of assembling a continuous ring beam by means of an erector ring assembly rotatably mounted on apparatus used in a tunneling operation, which consists in detachably mounting an arcuate segment of the ring beam on a portion of said erector ring, which portion is temporarily rotated to a predetermined loading station adjacent the floor of the tunnel, then rotating the erector ring to bring a second portion of the erector ring to said predetermined loading position, then detachably mounting a second arcuate segment of the ring beam on said second portion of the ring in end-to-end relation to the first ring beam segment, and rigidly connecting the meeting ends of said segments together, thereafter repeating the mounting of successive arcuate segments on said erector ring and connecting their meeting ends together as aforesaid, until a complete continuous rigid ring beam is formed, then securing said completed ring beam to the tunnel wall, and detaching said complete ring beam from the erector ring to free the erector ring for further advance in the tunnel.

6. The method of assembling a continuous ring beam by means of an erector ring assembly rotatably mounted on a jumbo used in a tunneling operation, which consists in detachably mounting an arcuate segment of the ring beam on a portion of said erector ring, which portion is temporarily rotated to a predetermined loading station at the top of the jumbo adjacent the roof of the tunnel, then rotating the erector ring to bring a second portion of the erector ring to said predetermined loading position, then detachably mounting a second arcuate segment of the ring beam on said second portion of the ring in end-to-end relation to the first ring beam segment, and rigidly connecting the meeting ends of said segments together, thereafter successively repeating the mounting of arcuate segments on said erector ring and connecting their meeting ends together as aforesaid, until a complete continuous rigid ring beam is formed, then securing said completed ring beam to the tunnel wall, and detaching said complete ring beam from the erector ring to free the boring machine for further advance in the tunnel.

7. The method of assembling a continuous ring beam by means of an erector ring assembly rotatably mounted on a boring machine used in a tunneling operation, which consists in detachably mounting an arcuate segment of the ring beam on a portion of said erector ring, which portion is temporarily rotated to a predetermined loading station adjacent the floor of the tunnel, then rotating the erector ring to bring a second portion of the erector ring to said predetermined loading position, then detachably mounting a second arcuate segment of the ring beam on said second portion of the ring in end-to-end relation to the first ring beam segment, and rigidly connecting the meeting ends of said segments together, thereafter repeating the mounting of similar successive arcuate segments on said erector ring and connecting their meeting ends together as aforesaid, until a complete continuous rigid ring beam is formed, then securing said completed ring beam to the tunnel wall, and detaching said complete ring beam from the erector ring to free the boring machine for further advance in the tunnel.

References Cited in the file of this patent
UNITED STATES PATENTS 1,484,188    O'Rourke  --------------  Feb. 19, 1924